(12) United States Patent
Shirane et al.

(10) Patent No.: US 10,864,760 B2
(45) Date of Patent: Dec. 15, 2020

(54) RECORDING APPARATUS

(71) Applicant: SEIKO EPSON CORPORATION, Tokyo (JP)

(72) Inventors: Tatsuya Shirane, Shiojiri (JP); Shinji Kanemaru, Matsumoto (JP); Kazuhisa Nakamura, Matsumoto (JP); Yoshikazu Nagai, Shiojiri (JP); Keisuke Sasaki, Matsumoto (JP); Haruki Miyasaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/696,180

(22) Filed: Nov. 26, 2019

(65) Prior Publication Data
US 2020/0171851 A1    Jun. 4, 2020

(30) Foreign Application Priority Data

Nov. 30, 2018    (JP) .................................. 2018-224622

(51) Int. Cl.
| | |
|---|---|
| *B41J 13/00* | (2006.01) |
| *B41J 13/03* | (2006.01) |
| *B41J 13/08* | (2006.01) |
| *B41J 13/10* | (2006.01) |
| *B41J 29/02* | (2006.01) |
| *B41J 11/00* | (2006.01) |

(52) U.S. Cl.
CPC ........... *B41J 29/023* (2013.01); *B41J 11/007* (2013.01); *B41J 13/009* (2013.01); *B41J 13/03* (2013.01); *B41J 13/08* (2013.01)

(58) Field of Classification Search
CPC . B41J 13/009; B41J 13/02; B41J 13/03; B41J 13/08; B41J 13/103; B41J 29/023
See application file for complete search history.

(56) References Cited

U.S. PATENT DOCUMENTS

| | | | |
|---|---|---|---|
| 2005/0058480 A1 | 3/2005 | Ohashi et al. | |
| 2006/0024118 A1* | 2/2006 | Niikura | ..................... B41J 29/02 400/691 |
| 2006/0033943 A1* | 2/2006 | Yanagi | ................. G03G 15/231 358/1.13 |

FOREIGN PATENT DOCUMENTS

JP    2010047014    3/2010

* cited by examiner

*Primary Examiner* — Matthew Luu
*Assistant Examiner* — Kendrick X Liu
(74) *Attorney, Agent, or Firm* — Workman Nydegger

(57) ABSTRACT

A recording apparatus includes: a feeding unit that feeds a medium placed on a medium placing unit located on a back side (−Y) of the apparatus; a transport unit that transports the medium fed from the feeding unit; a recording unit that performs recording on the medium transported from the transport unit; a reverse path that transports the medium in a reverse direction after recording is performed by the recording unit to turn over the medium; and a feed driving motor that drives the feeding unit, wherein the feed driving motor is disposed above the reverse path.

7 Claims, 17 Drawing Sheets

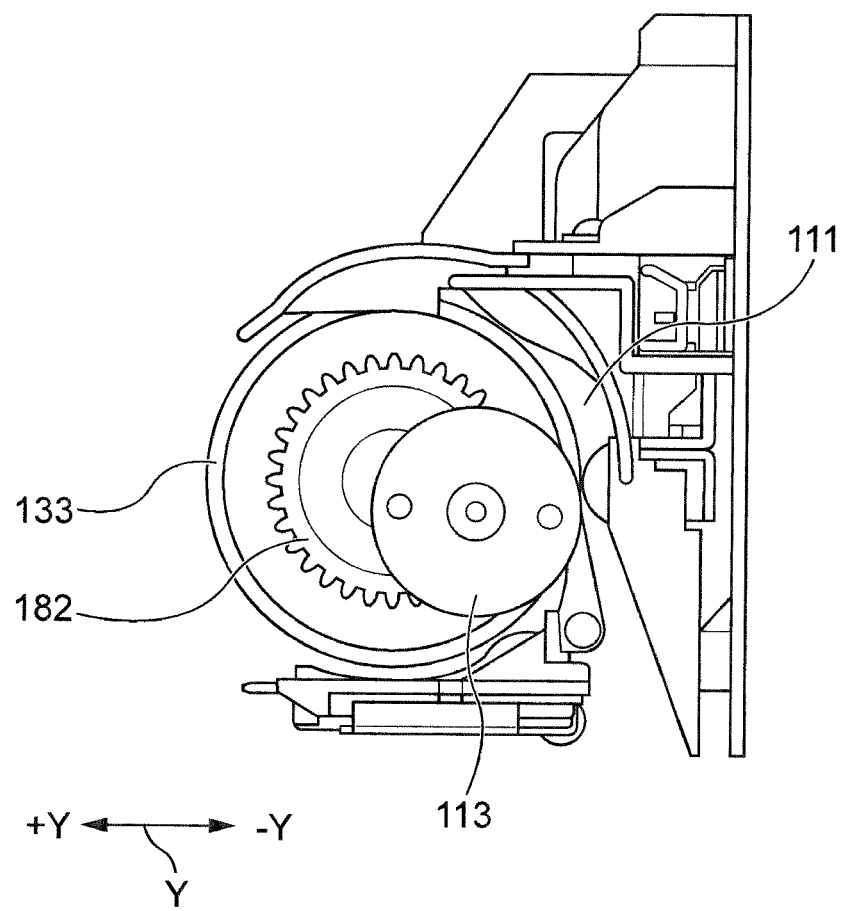

RECORDING APPARATUS

The present application is based on, and claims priority from JP Application Serial Number 2018-224622, filed Nov. 30, 2018, the disclosure of which is hereby incorporated by reference herein in its entirety.

BACKGROUND

1. Technical Field

The present disclosure relates to a recording apparatus such as an ink jet printer having a medium reverse path.

2. Related Art

JP-A-2010-47014 discloses an ink jet recording apparatus having a medium reverse path. The recording apparatus includes a feeding unit that feeds media placed on a medium placing unit, which is located on a back side of the apparatus. The recording apparatus further includes a feed driving motor for driving the feeding unit.

The feed driving motor disclosed in JP-A-2010-47014 is disposed under a downstream region of the feed path of the feeding unit at a position outside the width of the feed path (width of the region through which the medium passes). To position the feed driving motor, a predetermined space in the width direction and height direction is required. For this reason, the above arrangement of the feed driving motor is not suitable for downsizing the recording apparatus.

SUMMARY

In order to solve the above problem, a recording apparatus of the disclosure includes: a feeding unit that feeds a medium placed on a medium placing unit located on a back side of the apparatus; a transport unit that transports a medium fed from the feeding unit; a recording unit that performs recording on a medium transported from the transport unit; a reverse path which includes a reverse section that transports a medium in a reverse direction after recording is performed by the recording unit to turn over the medium; and a feed driving motor that drives the feeding unit, wherein the feed driving motor is disposed above the reverse path.

BRIEF DESCRIPTION OF THE DRAWINGS

FIG. 17 is a side view in which a frame on a side surface shown in FIG. 16 is removed.

DESCRIPTION OF EXEMPLARY EMBODIMENTS

Figure 1:
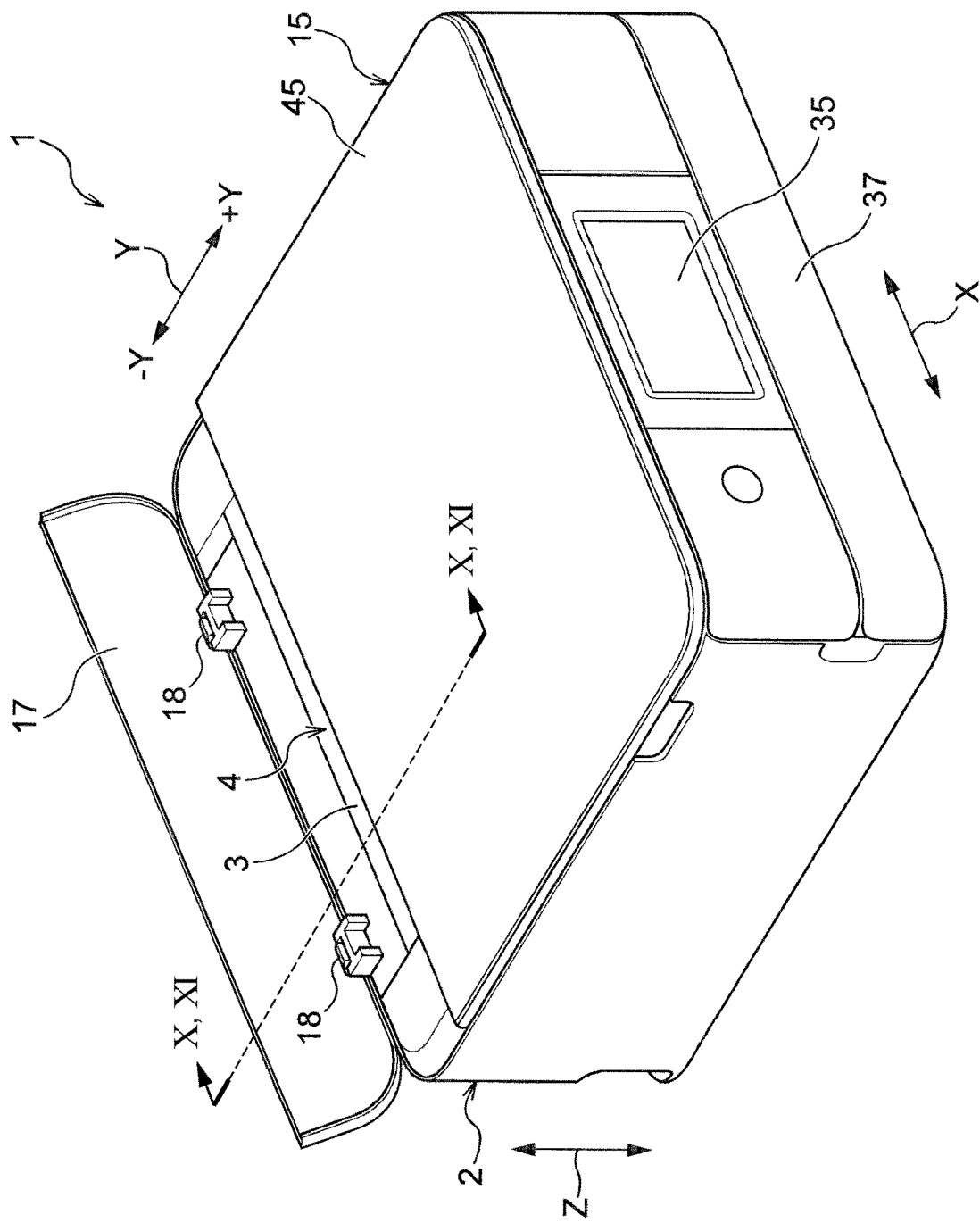
FIG. 1 is an external perspective view of a recording apparatus according to an embodiment of the disclosure.

First, the disclosure will be schematically described. A recording apparatus according to an aspect of the disclosure includes: a feeding unit that feeds a medium placed on a medium placing unit located on a back side of the apparatus; a transport unit that transports a medium fed from the feeding unit; a recording unit that performs recording on a medium transported from the transport unit; a reverse path which includes a reverse section that transports a medium in a reverse direction after recording is performed by the recording unit to turn over the medium; and a feed driving motor that drives the feeding unit, wherein the feed driving motor is disposed above the reverse path.

With this configuration, since the feed driving motor is disposed above the reverse path which includes the reverse section, the apparatus can be downsized in the height direction by using a space above the reverse path.

In the above aspect of the disclosure, the feed driving motor is disposed on a back side of a feed path between the feeding unit in which a medium is fed by the feeding unit and the transport unit.

With this configuration, the feed driving motor is disposed on the back side of the feed path between the feeding unit in which a medium is fed by the feeding unit and the transport unit. In other words, the feed driving motor is disposed at a position above the reverse path and on the back side of the feed path, that is, a region between the reverse path and the feed path. Accordingly, the apparatus can be downsized in the depth direction.

In the above aspect of the disclosure, the feed driving motor is disposed at a position that overlaps with the reverse path in a width direction and a depth direction of the recording apparatus in top view.

With this configuration, since the feed driving motor is disposed at a position that overlaps with the reverse path in the width direction and the depth direction of the recording apparatus in top view, the apparatus can be downsized in the width direction and the depth direction.

In the above aspect of the disclosure, the recording apparatus further includes an image reading apparatus having a reading unit that reads an image and disposed above the recording apparatus, the image reading apparatus including a read driving motor that drives the reading unit, wherein the feed driving motor is disposed at a position that overlaps with the read driving motor in at least one of a depth direction and a height direction of the recording apparatus in side view.

With this configuration, since the feed driving motor is disposed at a position that overlaps with the read driving motor in at least one of the depth direction and the height direction of the recording apparatus in side view, the recording apparatus which includes an image reading apparatus (scanner) can be downsized in at least one of the depth direction and the height direction of the apparatus.

In the above aspect of the disclosure, the recording apparatus further includes an openable cover disposed at an opening of the medium placing unit, the openable cover being configured to open for placing a medium, wherein the feed driving motor is disposed at a position that overlaps with the openable cover in a closed state in a depth direction of the recording apparatus in top view.

With this configuration, since the feed driving motor is disposed at a position that overlaps with the openable cover in the closed state in the depth direction of the recording apparatus in top view, the apparatus can be downsized in the depth direction.

In the above aspect of the disclosure, the recording apparatus further includes an openable cover disposed at an opening of the medium placing unit, the openable cover being configured to open for placing a medium, wherein the feed driving motor is disposed at a position that overlaps with the openable cover in a width direction of the recording apparatus in top view.

With this configuration, since the feed driving motor is disposed at a position that overlaps with the openable cover in a width direction of the recording apparatus in top view, the apparatus can be downsized in the width direction without the feed driving motor protruding in the width direction of the recording apparatus.

EMBODIMENTS

Referring to FIGS. 1 to 13, an embodiment of a recording apparatus of the disclosure will be detailed below. First, in the following description, the overall configuration of the recording apparatus according to an embodiment of the disclosure will be described with reference to FIGS. 1 and 2. Next, the specific configuration of the recording apparatus will be described with reference to FIGS. 1 to 13, focusing on the configuration of a characteristic part of the disclosure, which is an essential part of the recording apparatus. Then, operation modes and advantageous effects of the recording apparatus according to an embodiment of the disclosure will be described. Finally, other embodiments of the recording apparatus of the disclosure, which are partially different from the aforementioned embodiment in configuration will be described.

Figure 2:
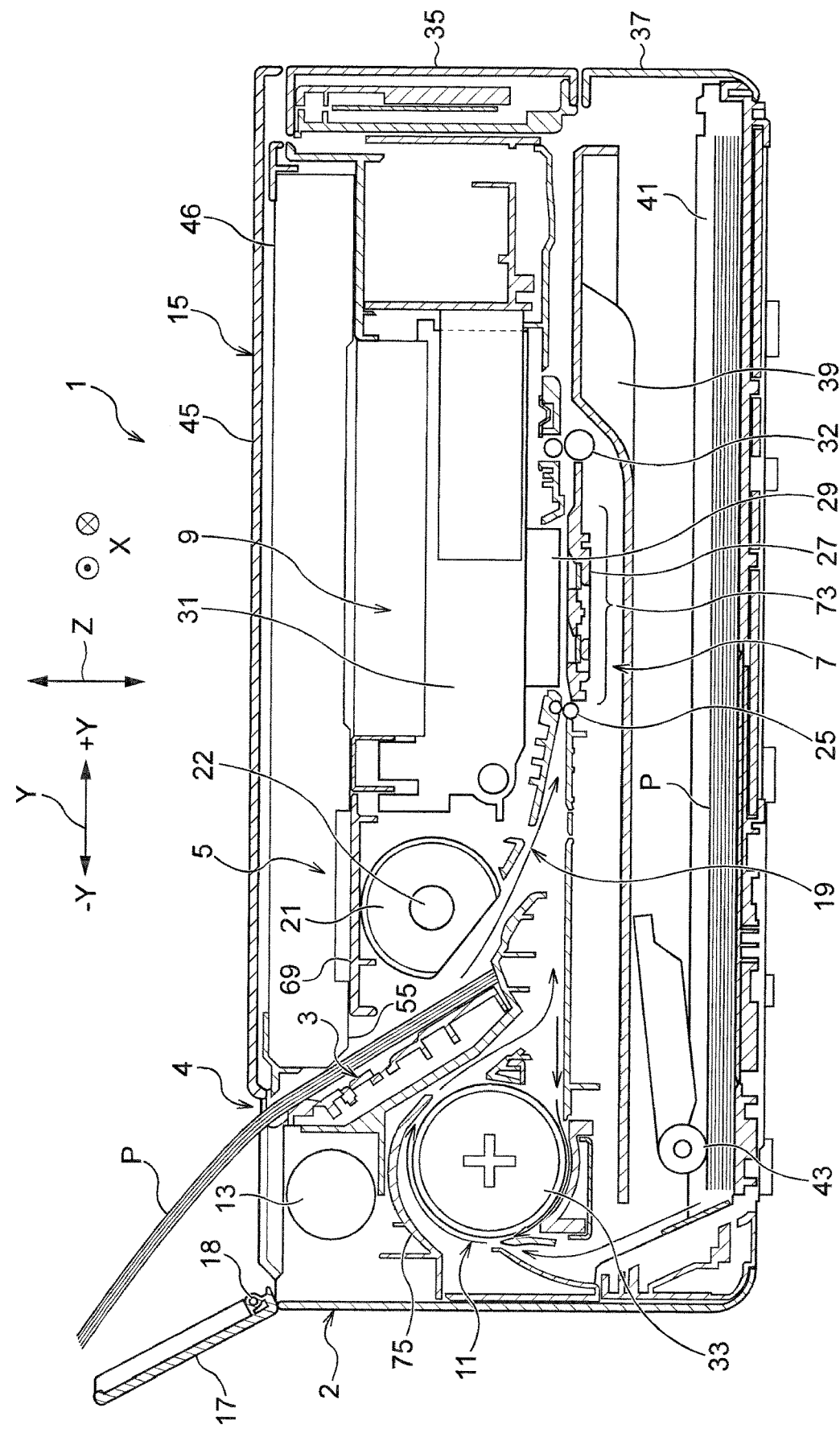
FIG. 2 is a side cross-sectional view of a recording apparatus according to an embodiment of the disclosure.

(1) Outline of Overall Configuration of Recording Apparatus (FIGS. 1 and 2)

A recording apparatus 1 of the disclosure includes: a feeding unit 5 that feeds a medium P placed on a medium placing unit 3, which is located on the back side (−Y) of the apparatus; a transport unit 7 that transports the medium P fed from the feeding unit 5; a recording unit 9 that performs recording on the medium P transported from the transport unit 7; a reverse path 11 which includes a reversing roller (reverse section) 33 that transports the medium P transported from the recording unit 9 in a reverse direction to turn over the medium P; and a feed driving motor 13 that drives the feeding unit 5. The feed driving motor 13 is disposed in a space above the reverse path 11.

Further, the recording apparatus 1 is a multifunction ink jet printer which includes a scanner 15 as an image reading apparatus in an upper part, and a printer main body 2 under the scanner 15. In the upper part of the back side (−Y) of the apparatus of the ink jet printer, an openable cover 17 is disposed to rotate forward and backward about a hinge 18. When the openable cover 17 is expanded backward (−Y), a feed port 4 is exposed so that the medium P can be inserted therein. A rear tray 3, which is stored in the feed port 4, can be used as the medium placing unit 3.

The feeding unit 5 includes: a feed driving motor 13; a feed path 19 that guides the medium P placed on the rear tray 3 to the transport unit 7; a feed driving roller 21 disposed in the feed path 19, the feed driving roller 21 being composed of, for example, a D-shaped roller; and a feeding unit gear train 23 (FIGS. 3 to 5 described later) for transmitting the rotation of an output shaft of the feed driving motor 13 to the feed driving roller 21. The D-shaped roller is configured to complete a feeding operation of the medium P while it makes one turn. This simplifies the mechanism of the feeding unit 5 and contributes to downsizing of the apparatus and reduction in the product cost. The transport unit 7 includes: a transport roller 25 for holding the medium P fed from the feeding unit 5 and transporting it to the recording unit 9, the transport roller 25 being composed of, for example, a nip roller; a platen 27 that abuts the underside of the medium P and supports the medium P to which a transport force is applied by the transport roller 25; an output roller 32 that outputs the medium P to the outside of the apparatus after recording is performed, the output roller 32 being composed of, for example, a nip roller; and a transport driving motor and a transport gear train, which are not shown in the figure, that apply driving force to the transport roller 25 and the output roller 32.

The recording unit 9 includes: a recording head 29 that ejects ink, which is an example of liquid, onto an upper surface of the medium P, which is a recording surface, to thereby perform recording; a carriage 31 which carries the recording head 29 and reciprocates in the apparatus width direction X as a scan direction; and a driving motor for driving the carriage 31 and a timing belt, which are not shown in the figure. Further, the reverse path 11 is disposed in a space on the back side (−Y) of the feed path 19. In the reverse path 11, a reversing roller 33 is provided to abut the medium P transported into the reverse path 11 and apply a transport force in the reverse direction to the medium P.

In addition, the recording apparatus 1 includes an operation panel 35 disposed in an upper part on the front side (+Y) of the apparatus so as to open by rotating about the upper end, and an openable lid 37 disposed in a lower part on the front side (+Y) of the apparatus so as to open by rotating about the lower end. Furthermore, the printer main body 2 includes an output stacker 39 that is movable in the depth direction Y and configured to protrude or to be pulled out when the openable lid 37 is expanded forward (+Y), and a medium cassette 41 on which the medium P is placed flat. In addition, a pickup roller 43 is disposed at a back position inside the printer main body 2 in a portion where the medium cassette 41 is accommodated. The pickup roller 43 is configured to pick up the media P set in the medium cassette 41 one by one from the above.

Further, in the upper part of the printer main body 2 having the above configuration, the scanner 15 is provided as an image reading apparatus as described above. The scanner 15 is a flatbed scanner, and includes, for example, a lid 45 that can be vertically opened; and a lower housing 55 (described later in connection with FIG. 10). The lower housing 55 accommodates: a document table 46; an image sensor 47 (described later in connection with FIG. 5) as an image reading unit; a drive belt 49 (described later in connection with FIG. 3) that causes the image sensor 47 to scan in the apparatus width direction X, the drive belt 49 being composed of, for example, a timing belt; and a read driving motor 53 that transmits a driving force by using a plurality of pulleys 51 around which the drive belt 49 is wound, and a drive pulley 51A, which is one of the pulleys 51. Further, the scanner 15 is connected to a damper 59 via a damper gear train 57 so that opening and closing operation can be smoothly performed (described later in connection with FIGS. 4 and 5). In addition, the recording apparatus 1 includes an electronic substrate on which an electronic element E that controls each of the components of the recording apparatus 1 is mounted. The electronic substrate is composed of two substrates, that is, a relay board 61 (described later in connection with FIGS. 4 and 9), which is disposed in a vertical posture extending in the height direction Z of the apparatus, and, for example, a main substrate 63 (described later in connection with FIGS. 4 and 9), which is disposed in a horizontal posture perpendicular to the relay board 61.

(2) Specific Configuration of Essential Part of Recording Apparatus (FIGS. 1 to 13)

First, in the present embodiment, as shown in FIG. 2, the feed driving motor 13 is disposed in the printer main body 2 at a position on the back side (−Y) of the feed path 19 between the feeding unit 5 and the transport unit 7, to which the medium P is fed by the feed driving roller 21 of the feeding unit 5. That is, while the feed driving motor 13 in a conventional art is disposed in the lower part of the printer main body 2, which is a downstream region in the feed path 19, the feed driving motor 13 of the present embodiment is disposed in an available space in the upper part of the printer main body 2 on the back side (−Y) of the feed path 19, which is an upstream region in the feed path 19.

Figure 3:
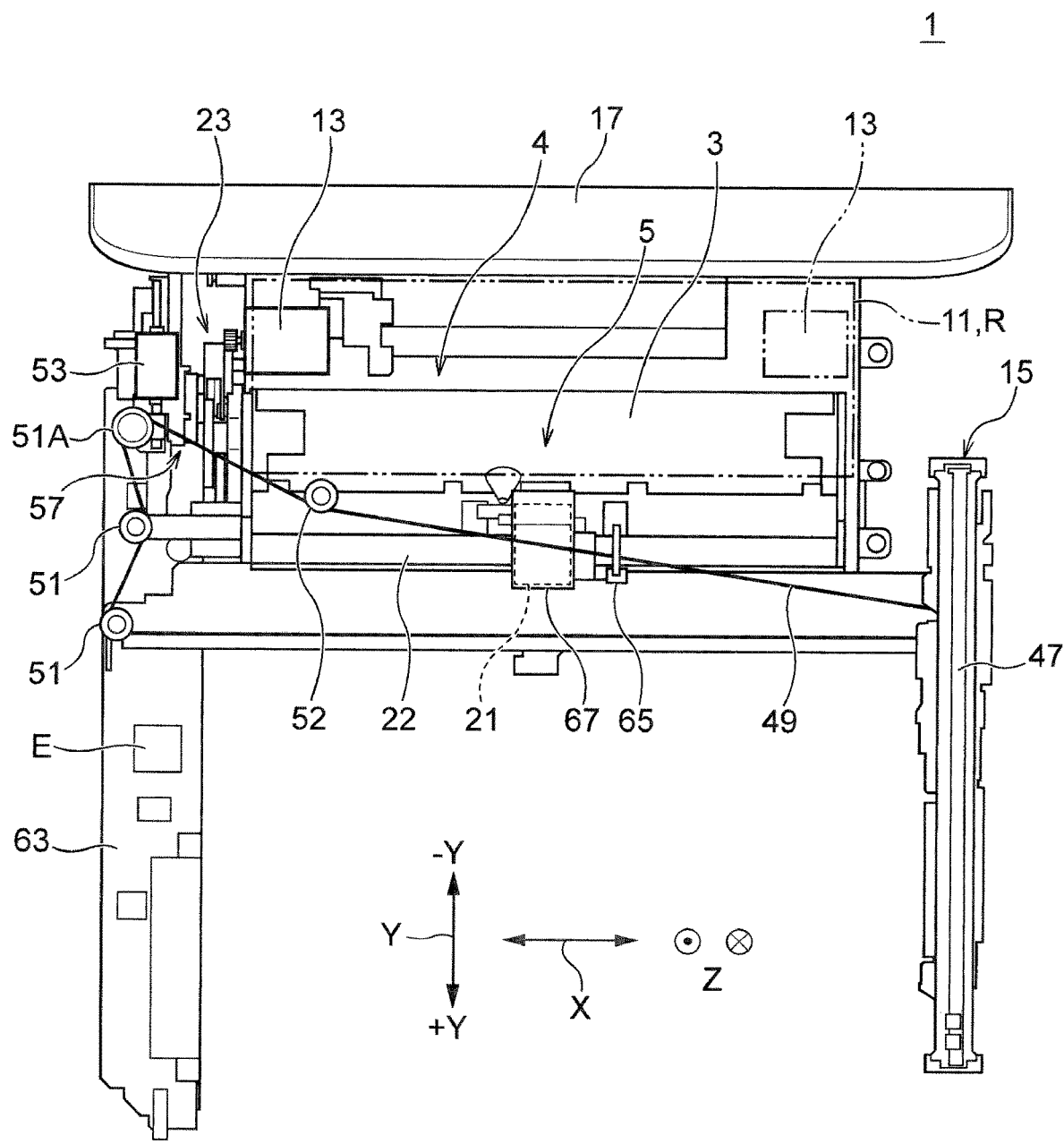
FIG. 3 is a plan view of an essential part of a recording apparatus according to an embodiment of the disclosure.

Further, in the present embodiment, as shown in FIGS. 2 and 3, the feed driving motor 13 is disposed at a position that overlaps with a region R in which the reverse path 11 exists in the width direction X and the depth direction Y of the recording apparatus 1 in top view. That is, the feed driving motor 13 may be entirely included in the region R in which the reverse path 11 exists, or may be partially positioned outside the region R in which the reverse path 11 exists. In the present embodiment, the feed driving motor 13 is positioned on the left side of the region R in which the reverse path 11 exists as indicated by the solid line in FIG. 3. However, the feed driving motor 13 may also be positioned on the right side of the region R in which the reverse path 11 exists as indicated by the virtual line in FIG. 3.

Figure 5:
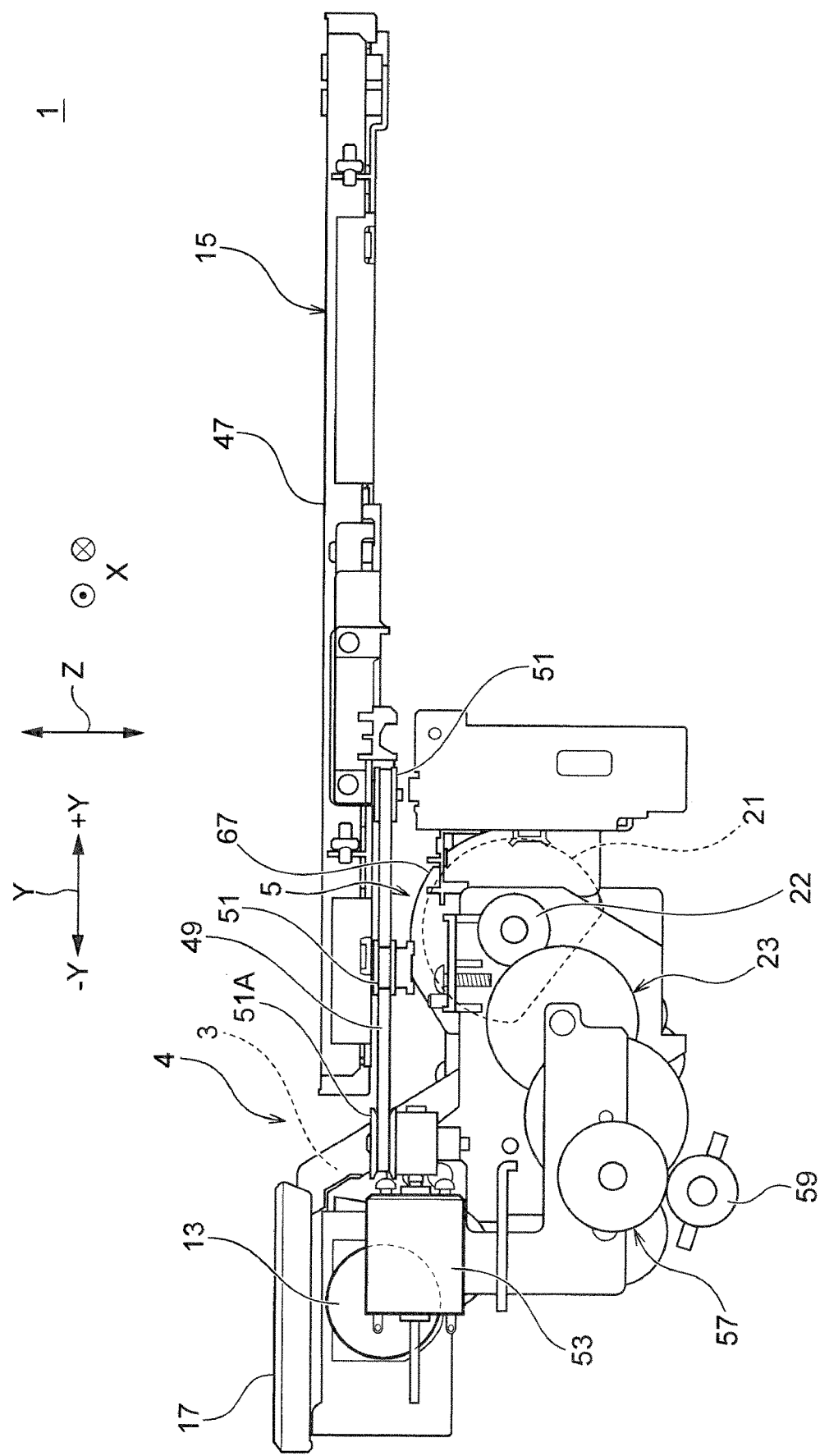
FIG. 5 is a side cross-sectional view of an essential part of a recording apparatus according to an embodiment of the disclosure.

Further, in the present embodiment, as shown in FIGS. 3 and 5, the feed driving motor 13 is disposed at a position that overlaps with the read driving motor 53 of the image reading apparatus 15 in both the depth direction Y and the height direction Z of the recording apparatus 1 in side view. The feed driving motor 13 may be entirely included in the region in which the read driving motor 53 exists in both the depth direction Y and the height direction Z of the recording apparatus 1, or may be partially included. Further, the feed driving motor 13 may also be disposed at a position that overlaps with the read driving motor 53 in either the depth direction Y or the height direction Z of the recording apparatus 1.

Further, in the present embodiment, as shown in FIG. 5, the feed driving motor 13 is disposed at a position that overlaps with the openable cover 17 in a closed state in the depth direction Y of the recording apparatus 1 in top view. As shown in the figure, the feed driving motor 13 may be entirely included in a region of the openable cover 17 in the closed state in the depth direction Y, or may be partially included in the region and partially positioned outside the region.

Further, in the present embodiment, as shown in FIG. 3, the feed driving motor 13 is disposed at a position that overlaps with the openable cover 17 in the width direction X of the recording apparatus 1 in top view. In the embodiment shown in the figure, the dimension of the openable cover 17 in the width direction X is substantially the same as the dimension of the entire recording apparatus 1 in the width direction X. Accordingly, the feed driving motor 13 is always included in the region of the openable cover 17 in the width direction X unless the feed driving motor 13 laterally protrudes from the printer main body 2. However, when the dimension of the openable cover 17 in the width direction X is smaller than the dimension of the entire recording apparatus 1 in the width direction X, the feed driving motor 13 may be positioned outside the region of the openable cover 17 in the width direction X. According to the present embodiment, in this configuration as well, the feed driving motor 13 is configured to at least partially overlap with the openable cover 17 in the width direction X.

While the above description describes positioning of the feed driving motor 13 relative to the openable cover 17, the read driving motor 53 is also positioned in the same manner relative to the openable cover 17. That is, in the present embodiment, the read driving motor 53 is disposed at a position that overlaps with the openable cover 17 in a closed state in the depth direction Y of the recording apparatus 1 as shown in FIG. 5, and is disposed at a position that overlaps with the openable cover 17 also in the width direction X of the recording apparatus 1 as shown in FIG. 3.

In addition, in the present embodiment, a phase detection sensor 65 (FIG. 3) for detecting the phase of the feed driving roller 21 is provided on a drive shaft 22 of the feed driving roller 21. The phase detection sensor 65 is disposed in a region of the feed path 19 in the width direction X, through which the medium P passes. Accordingly, compared with the case where the phase detection sensor 65 is disposed outside the region of the feed path 19 in the width direction X, the apparatus can be reduced in size in the width direction X.

Figure 4:
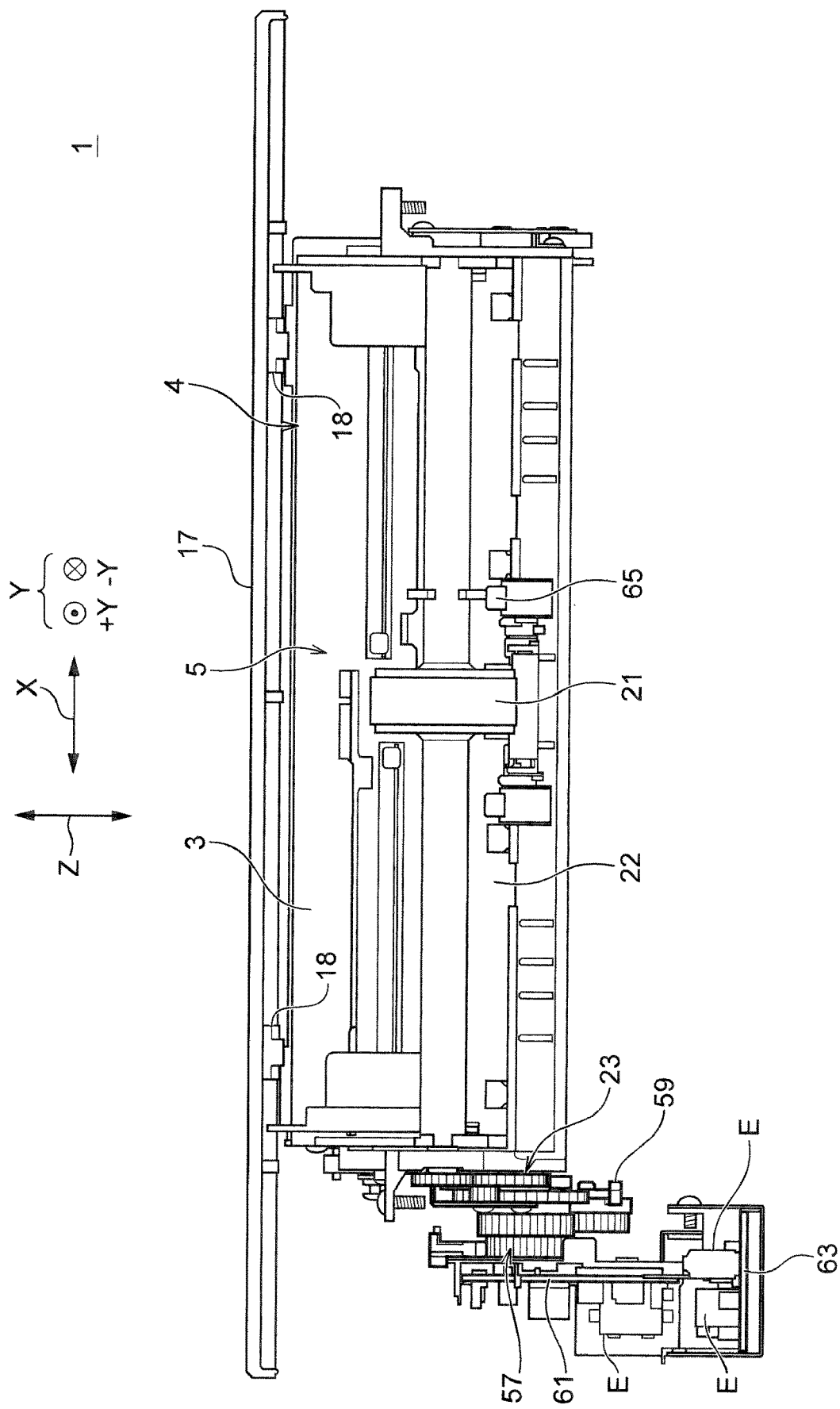
FIG. 4 is a front view of an essential part of a recording apparatus according to an embodiment of the disclosure.

Next, the positional relationship among the feeding unit gear train 23, the damper gear train 57, the relay substrate 61, and the main substrate 63 will be described. That is, as shown in FIG. 4, the feeding unit gear train 23 and the damper gear train 57 connected to the damper 59 of the image reading apparatus 15 are disposed at positions that overlap with each other in the height direction Z of the recording apparatus 1. Further, the relay substrate 61, which is one of two substrates separated is positioned outside in the apparatus width direction X of the damper gear train 57. Accordingly, the image reading gear train 57 and the relay substrate 61 are positioned offset outside in the apparatus width direction X by a predetermined distance to thereby ensure a space for positioning the feeding unit gear train 23 inside the image reading gear train 57 and the relay substrate 61. In addition, the main substrate 63 is not disposed outside in width direction X of the relay substrate 61, but disposed under the relay substrate 61 to thereby downsize the recording apparatus 1 in the width direction X.

Figure 6:
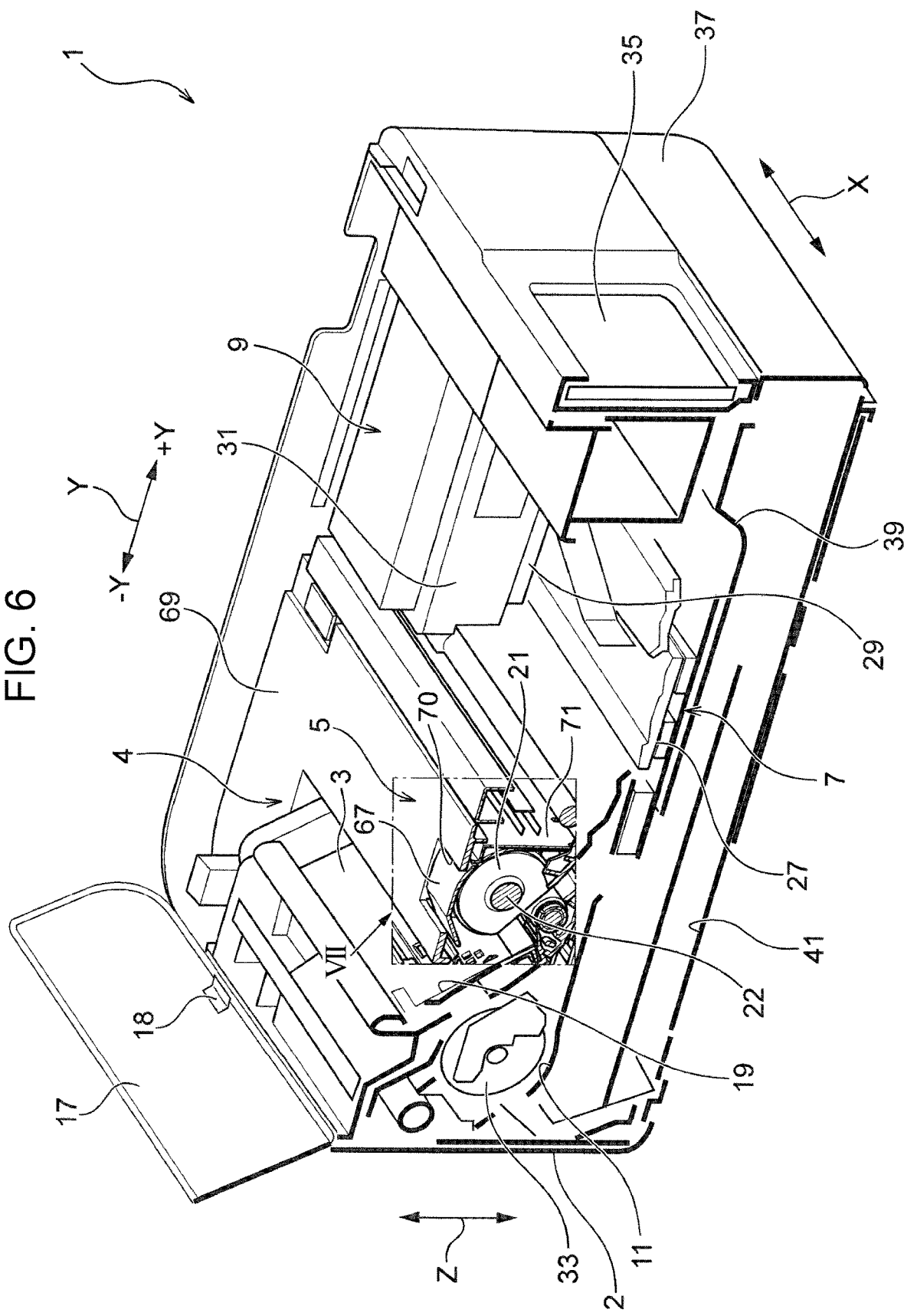
FIG. 6 is a partially broken perspective view of a recording apparatus according to an embodiment of the disclosure.
Figure 7:
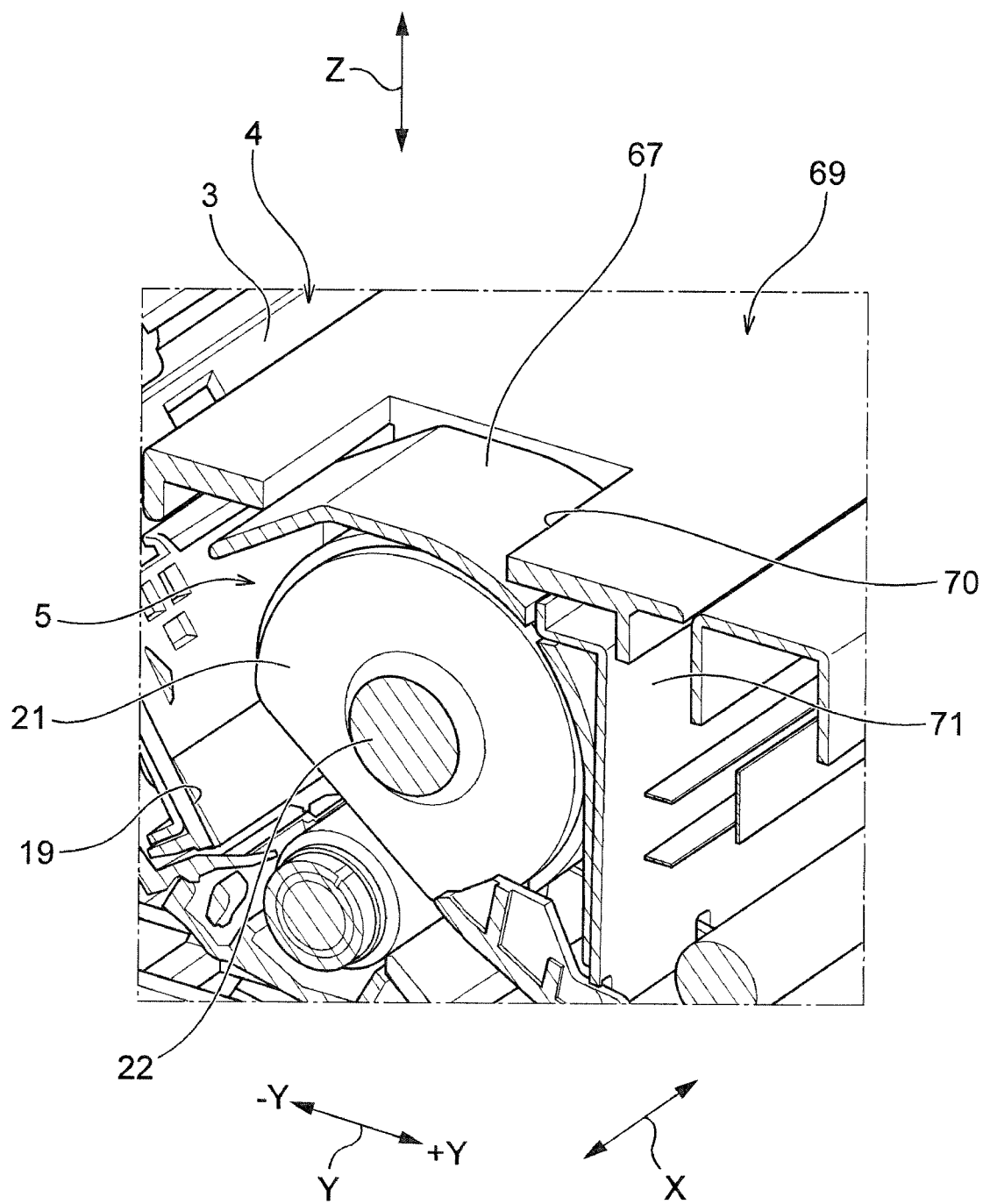
FIG. 7 is an enlarged view of a part VII in FIG. 6 according to an embodiment of the disclosure.

Next, referring to FIGS. 6 and 7, the positional relationship among a cover 67 of the feed driving roller 21, an upper housing 69 of printer main body 2, and a main frame 71 will be described. That is, a notch 70, for example, in a square aperture shape is provided in a portion of the upper housing 69 which is disposed above the feed driving roller 21. The cover 67 that protects the feed driving roller 21 from ink mist or the like is partially inserted in the notch 70, overlapping in the apparatus height direction Z.

Figure 8:
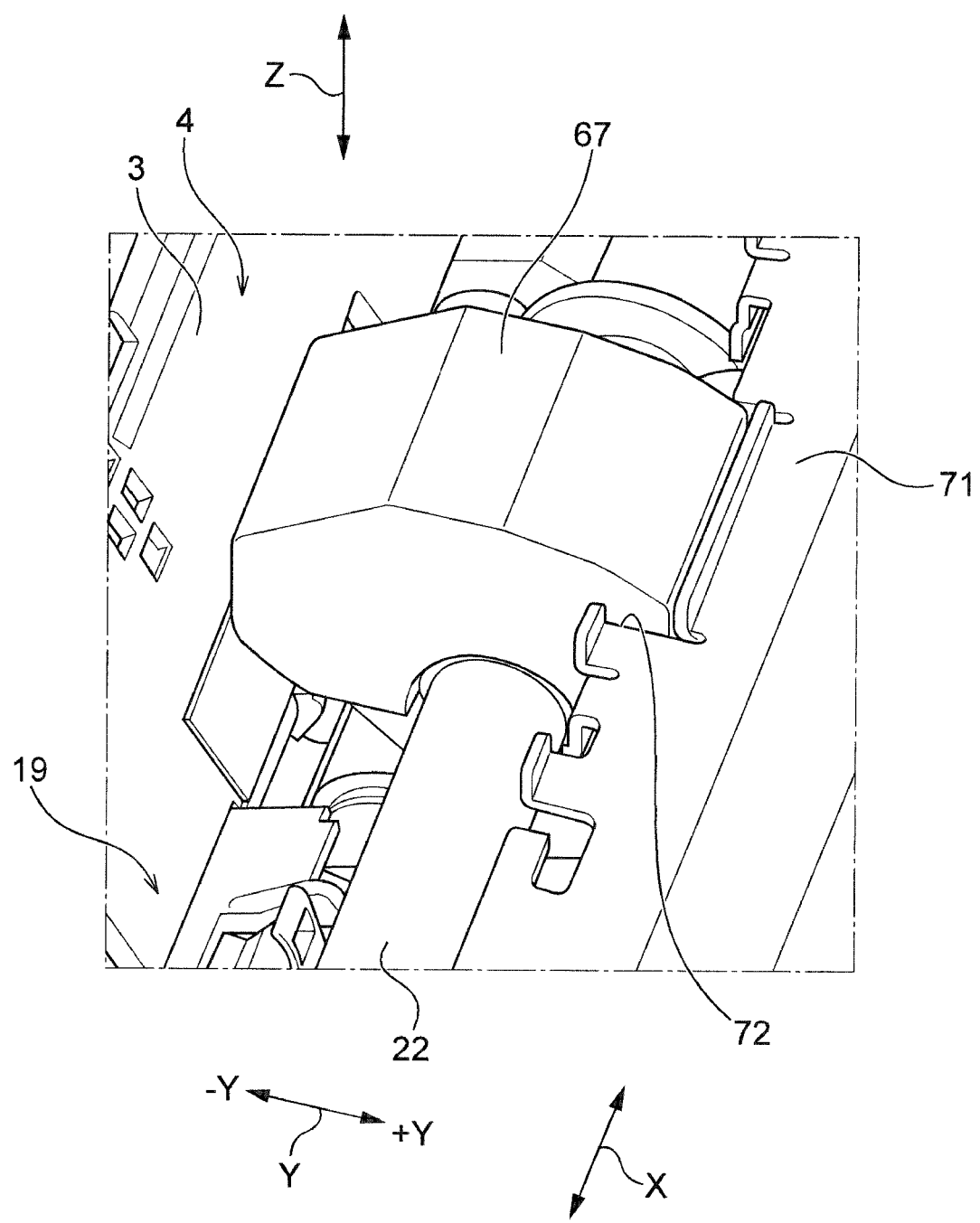
FIG. 8 is a perspective view illustrating a positional relationship between a roller cover of a feed driving roller and a main frame of a recording apparatus according to an embodiment of the disclosure.
Figure 9:
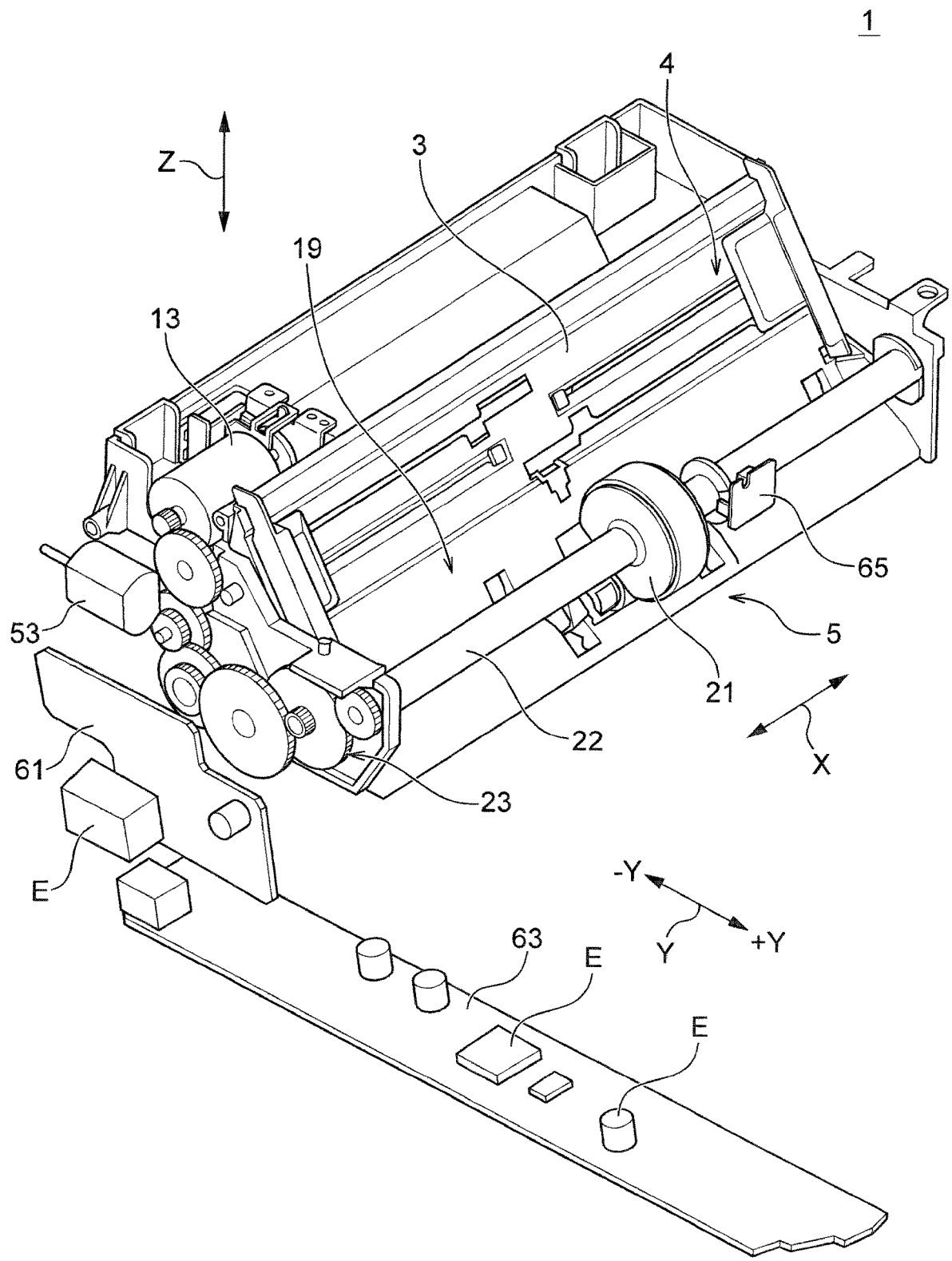
FIG. 9 is a perspective view of an essential part of a recording apparatus according to an embodiment of the disclosure.

Further, as shown in FIG. 8, a recess 72, for example, in a rectangular shape is formed in a portion of the main frame 71 which is disposed on the front side (+Y) of the feed driving roller 21. The cover 67 for the feed driving roller 21 is partially inserted in the recess 72 such that the cover 67 and the main frame 71 are positioned close to each other in the direction Y to thereby downsize the recording apparatus 1 in the height direction Z and the depth direction Y. Next, the positional relationship between the feed path 19 for the medium P and the image reading apparatus 15, and modification of the partial configuration of the image reading apparatus 15 that is required in accordance with the positional relationship will be described.

Figure 10:
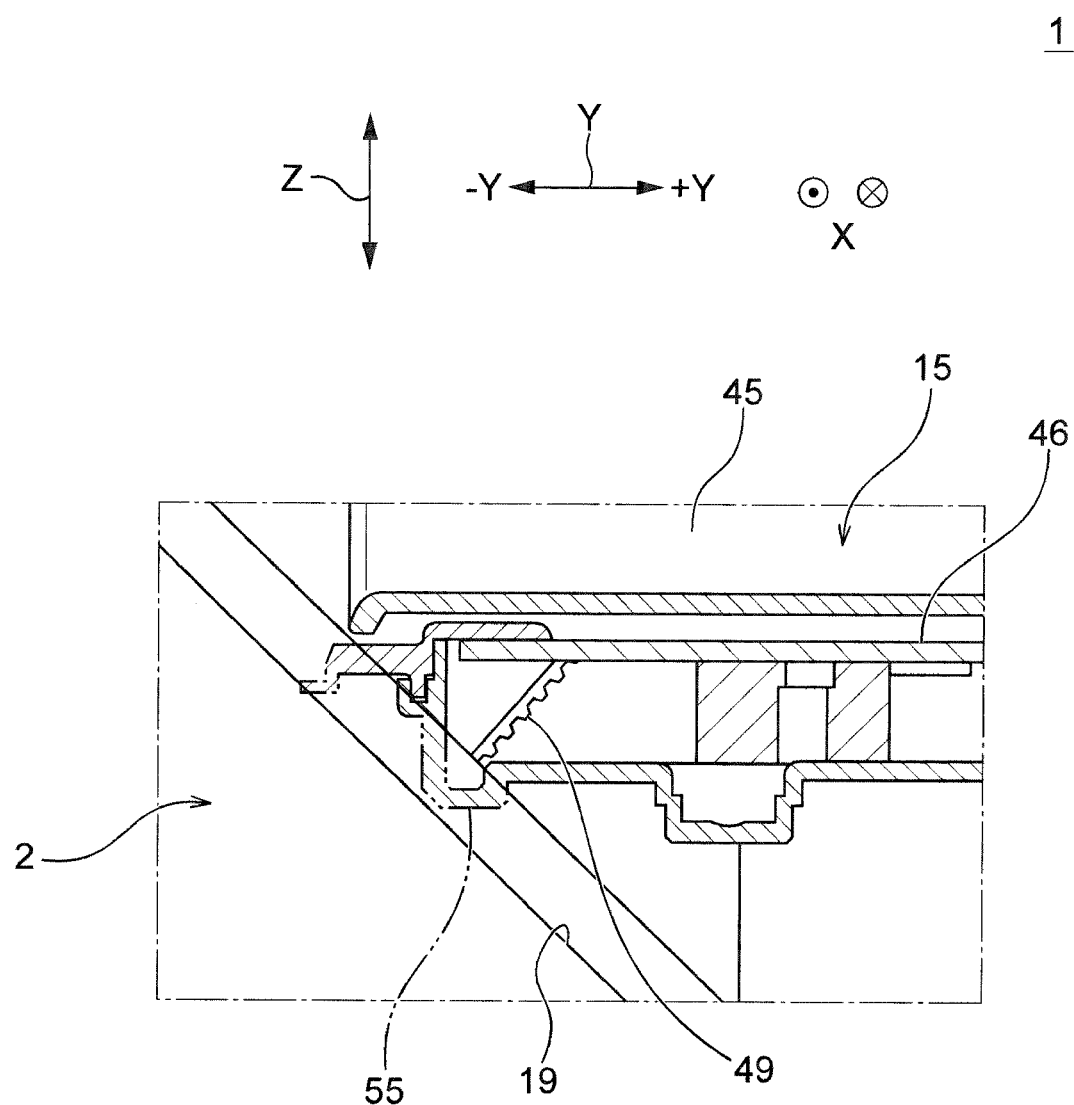
FIG. 10 is a cross-sectional view of a lower housing of a recording apparatus according to an embodiment of the disclosure taken along the line X-X in FIG. 1 before a solution is taken.
Figure 11:
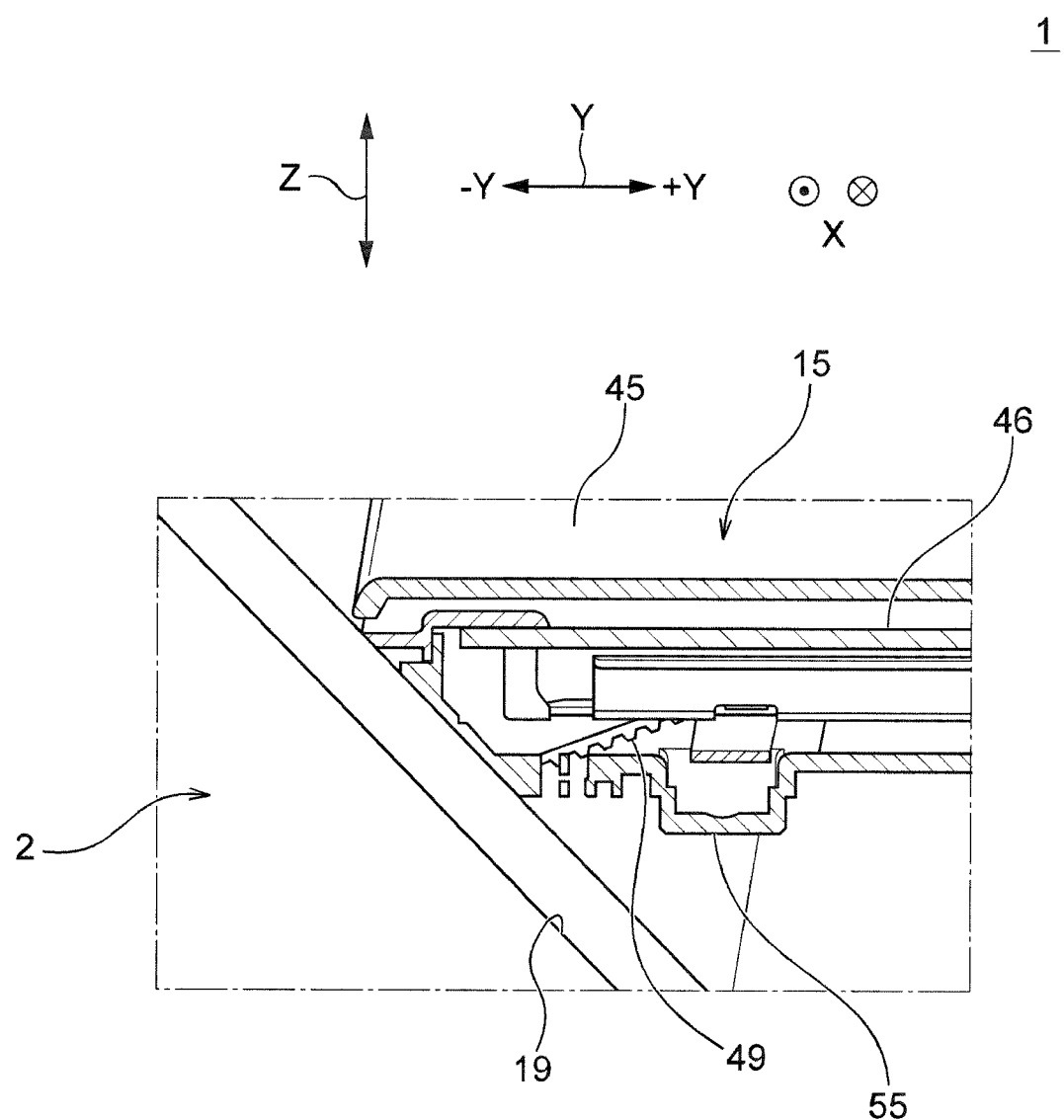
FIG. 11 is a cross-sectional view of a lower housing of a recording apparatus according to an embodiment of the disclosure taken along the line X-X in FIG. 1 after a solution is taken.

In the present embodiment, as shown in FIG. 2, the feed driving motor 13 is disposed in an available space in the upper part of the recording apparatus 1 on the back side of the feed path 19. Accordingly, in the present embodiment, in order to avoid a gap between the feed driving motor 13 and the feed path 19 on the front side thereof (+Y) being decreased, the position of the feed path 19 at this site is displaced forward (+Y) to some extent. However, as shown in FIG. 10, there may be a case where the feed path 19, which is displaced forward (+Y), partially interferes with the lower housing 55 of the image reading apparatus 15. Therefore, in the present embodiment, as shown in FIG. 11, a rear end of the lower housing 55 of the image reading apparatus 15 is modified to, for example, a chamfered shape as illustrated so that the feed path 19 does not interfere with the lower housing 55 of the image reading apparatus 15.

Figure 12:
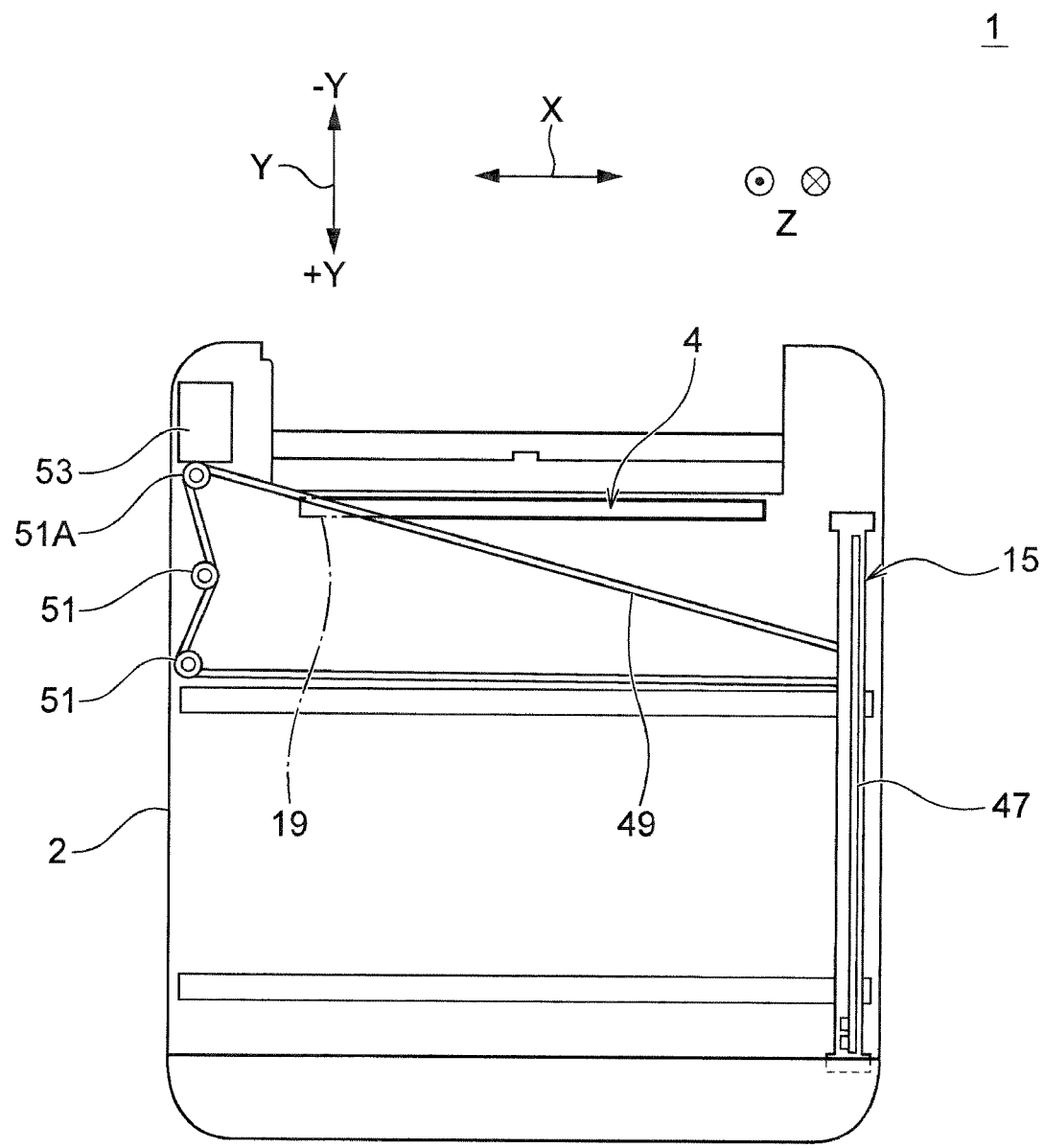
FIG. 12 is a plan view illustrating a routing of a drive belt of a recording apparatus according to an embodiment of the disclosure before a solution is taken.
Figure 13:
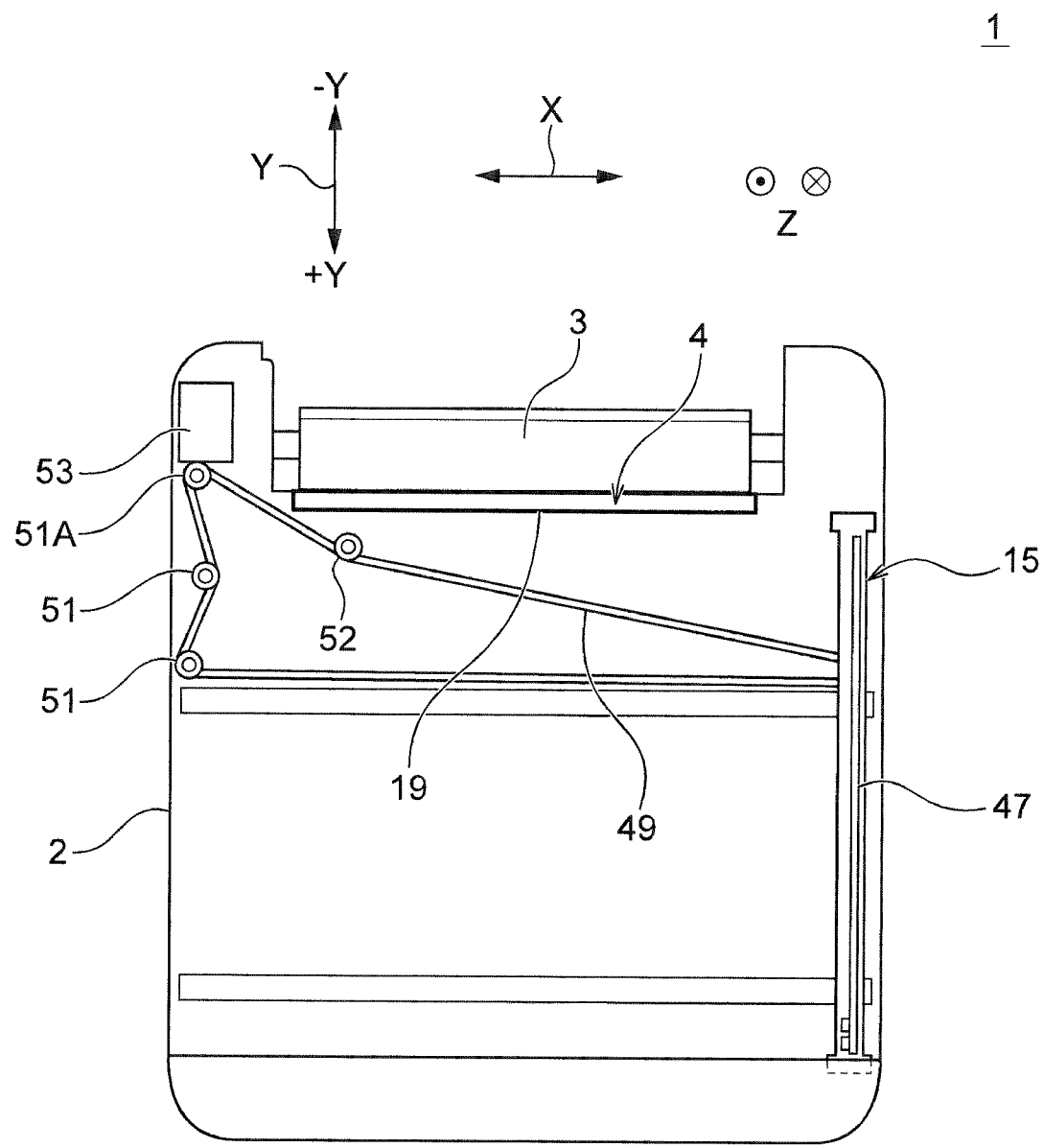
FIG. 13 is a plan view illustrating a routing of a drive belt of a recording apparatus according to an embodiment of the disclosure after a solution is taken.
Figure 14:
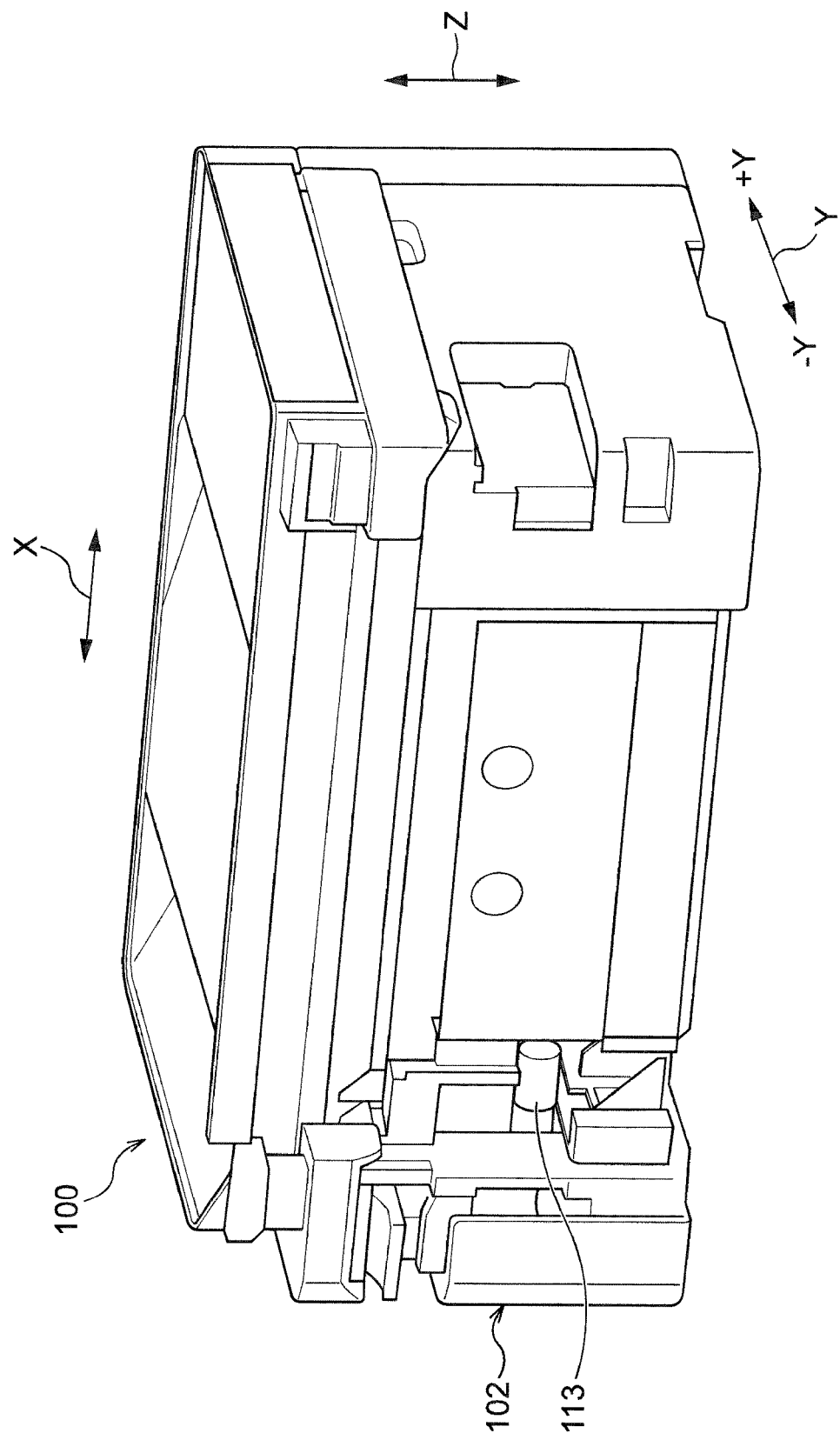
FIG. 14 is a perspective view of another structure of the recording apparatus as viewed from the back of the apparatus.
Figure 15:
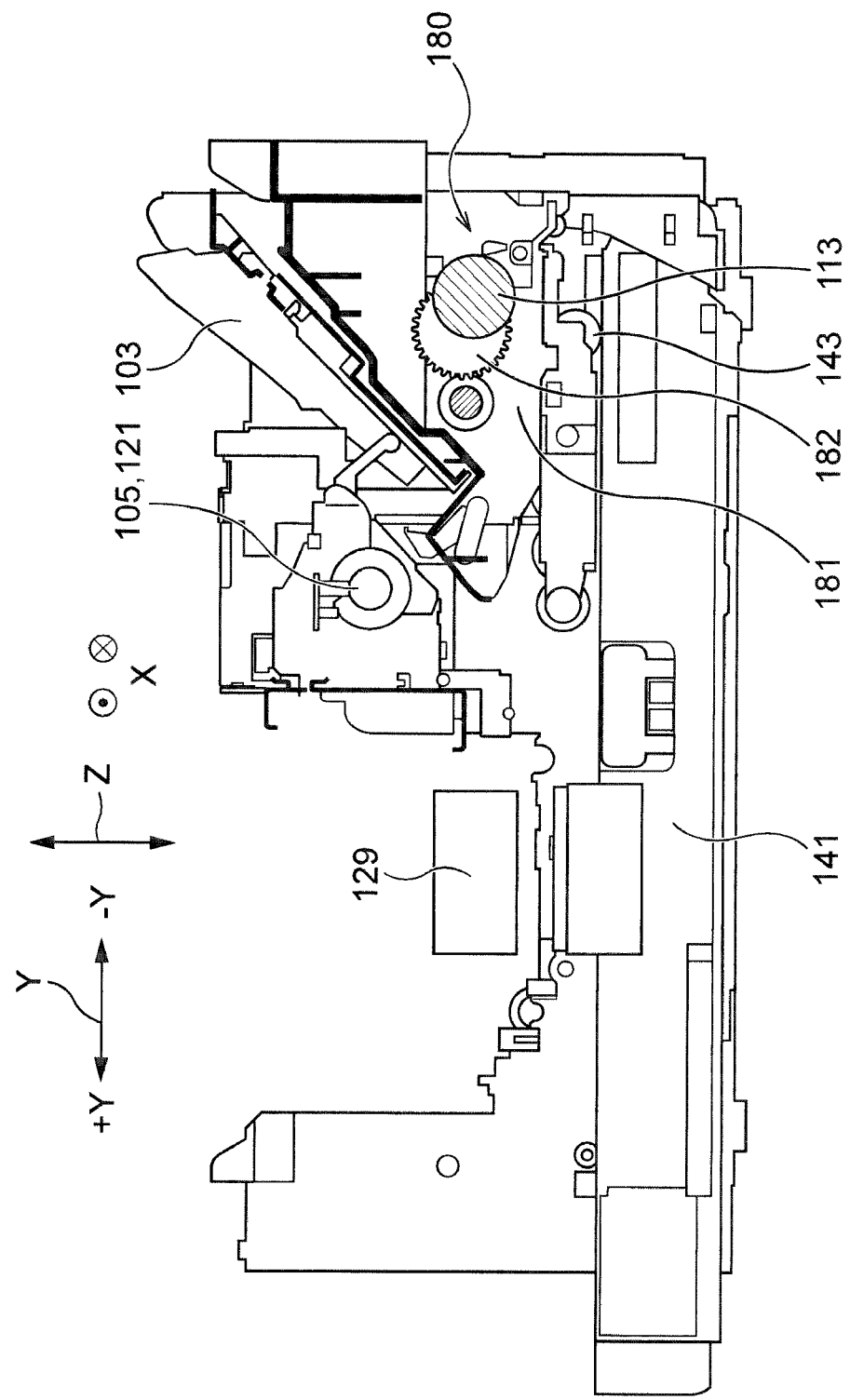
FIG. 15 is a schematic vertical cross-sectional view of another structure of the recording apparatus.
Figure 16:
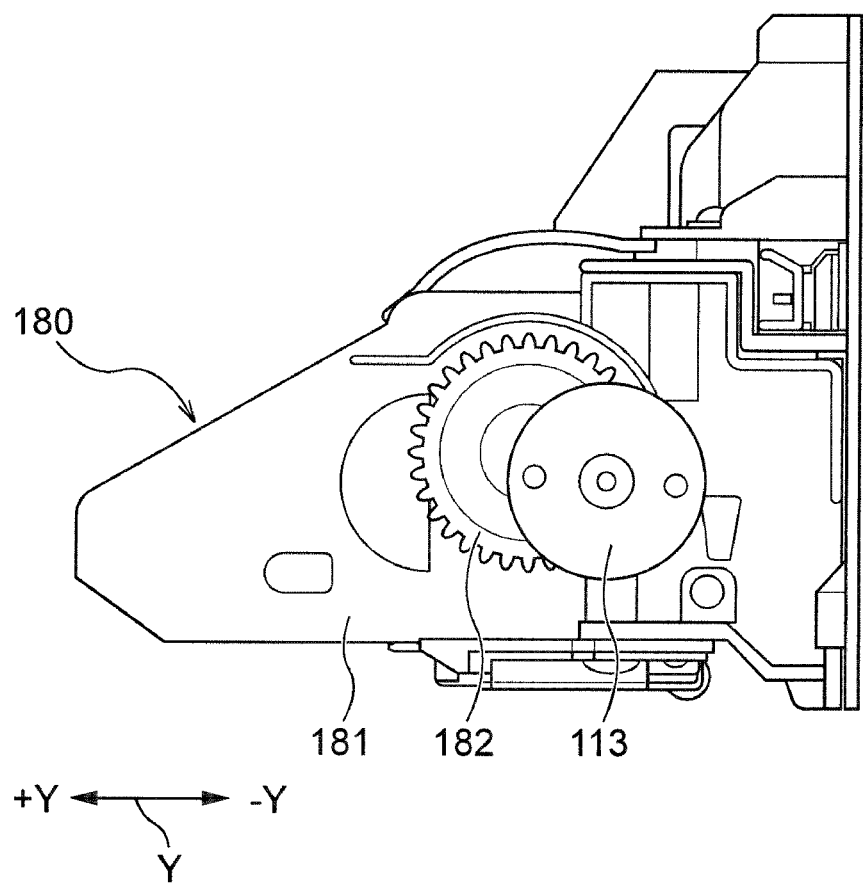
FIG. 16 is a side view of a reverse path portion of another structure of the recording apparatus.

Further, when the position of the feed path 19 is displaced forward (+Y), there may be a case where the drive belt 49 of the image reading apparatus 15 overlaps with the feed path 19 for the medium P and interferes part of the feed path 19 as shown in FIG. 12. Therefore, in the present embodiment, an additional pulley 52 is provided as shown in FIG. 13 to thereby modify the routing of the drive belt 49 so that the drive belt 49 does not interfere with the feed path 19.

(3) Operation Modes and Advantageous Effects of Recording Apparatus

In use of the recording apparatus 1 having the above configuration to perform recording on the media P set in the rear tray 3, the openable cover 17 is opened upward as shown in FIG. 2 so that the media P are supported by the rear tray 3. Further, when the rear tray 3 is provided with an extension tray that is pulled out upward for use, the extension tray is pulled out upward as necessary before the media P are set. As a command for executing recording is issued from the operation panel 35 or a personal computer (PC), the feed driving roller 21 starts to rotate to thereby start feeding of the medium P. The medium P is smoothly fed out without contacting the lower housing 55 of the image reading apparatus 15.

When a leading edge of the medium P reaches the nip point of the transport roller 25, the medium P receives a transport force from the transport roller 25 and is transported toward a downstream recording execution area 73. In the recording execution area 73, ink is ejected from the recording head 29 onto the upper surface of the medium P supported by the platen 27, which abuts the undersurface of the medium P, to thereby perform a desired recording on the front surface of the medium P. When the leading edge of the medium P that has passed the recording execution area 73 reaches the nip point of the output roller 32, the medium P also receives a transport force from the discharge roller 32 and is transported further downstream.

When recording on the surface of the medium P is completed, the transport roller 25 and the output roller 32 start to rotate in the reverse direction. Accordingly, as the medium P enters the reverse path 11 from the trailing edge, the medium P that has been transported by the reversing roller 33 is turned over, and again supplied to the nip point of the transport roller 25. When the medium P reaches the recording execution area 73 and the nip point of the output roller 32, recording is performed on the rear surface of the medium P. When recording on the surface of the medium P is completed, the media P are sequentially transferred onto the output stacker 39, which has protruded forward to receive the media P, and then taken out.

Further, while the feed driving motor 13 and the region R of the reverse path 11 are positioned to overlap with each other in the width direction X of the apparatus as shown in FIG. 3, they are partitioned in the height direction Z by a guide wall 75 and the like as shown in FIG. 2 such that they do not interfere with each other. Accordingly, the medium P is also smoothly transported in the reverse path 11.

Further, in use of the image reading apparatus 15 to read (scan) image information on the document, the lid 45 is opened and the document is set on the document table 46. After the lid 45 is closed, a command is issued from the operation panel 35 or a PC to start reading of the image information. In response to the command, the read driving motor 53 starts driving and rotates one of the pulleys 51 as the drive pulley 51A. Rotation of the drive pulley 51A is transmitted to the drive belt 49 which is wound around the pulleys 51. Further, the image sensor 47, which engages with part of the drive belt 49, is moved in the width direction X of the apparatus, for example, to perform reading of a desired image information.

Further, in the present embodiment, the drive belt 49 is routed so as not to interfere with the feed path 19 for the medium P by providing an additional pulley 52 as described above. Accordingly, by virtue of smooth movement of the drive belt 49, highly accurate reading of image information is performed. In addition, when the image information read by the image sensor 47 is outputted onto the medium P set on the rear tray 3, the medium P is transported through the feed path 19 without interfering with the drive belt 49, and reaches the transport unit 7 and the recording unit 9 on the downstream region, where a desired recording is performed on the medium P.

According to the recording apparatus 1 of the present embodiment having the above configuration, in which the feed driving motor 13 is disposed in an available space above the reverse path 11, a downstream region of the feed path 19, which has been conventionally used as a space for positioning the feed driving motor 13, can be omitted to thereby reduce the size of the apparatus. Further, effective use of the available space as a space for other components can further reduce the size of the apparatus mainly in the height direction Z. In addition, the arrangement of the feed driving motor 13 overlapping with other components such as the read driving motor 53 in the width direction X, the depth direction Y or the height direction Z without interference can further reduce the size of the apparatus in the width direction X, the depth direction Y, or the height direction Z.

Description of Other Structures of Recording Apparatus

Referring to FIGS. 14 to 17, a recording apparatus 100 having another structure will be described. According to the recording apparatus 100, in a reverse unit 180 that includes a reverse path 111, both ends of a rotation shaft (not shown) of a reversing roller 133 are each supported by a frame 181 (only one frame is illustrated). A gear 182 is attached to the outside of the frame 181 of the rotation shaft (on a side opposite to the reversing roller 133) such that a power from a driving source is transmitted to the gear 182 to thereby rotate the reversing roller 133. A feed driving motor 113 is disposed at a position outside the gear 182 and overlapping with the reversing roller 133 in side view (FIG. 17). Here, the feed driving motor 113 may partially or entirely overlap with the reversing roller 133.

Furthermore, on the outside of the frame 181 and further outside of the feed driving motor 113, a feed gear train (not shown in the figure, and corresponding to the gear train designated by reference numeral 23 in the above embodiment) is disposed to transmit a rotation power of the feed driving motor 113 to the feed driving roller 121 of the feeding unit 105. That is, the feed driving motor 113 is disposed, by using a space between the reverse unit 180 and the feed gear train, at a position that overlaps with the reversing roller 133 in side view. Throughout the drawings, reference numeral 102 indicates the printer main body, 103 indicates the medium placing unit (rear tray), 105 indicates the feeding unit, 121 indicates the feed driving roller, 129 indicates the recording head, 141 indicates the medium cassette, and 143 indicates the pickup roller. In the recording apparatus 100, since the feed driving motor 133 is disposed at a position that overlaps with the reversing roller 113 in side view, a space between the reverse unit 180 and the feed gear train can be effectively used.

OTHER EMBODIMENTS

Although the recording apparatus 1 according to the disclosure basically has the configuration described above, it is possible to partially modify or omit the configuration without departing from the gist of the disclosure.

For example, the recording apparatus 1 according to the disclosure is not limited to a multifunction ink jet printer in which the printer main body 2 and the image reading apparatus 15 are integrally provided as described in the above embodiment, and may also be a simple recording apparatus which only includes the printer main body 2 without having a multi laser printer, a copying machine, and the image reading apparatus 15. Further, when the position of the feed driving motor 13 can be moved to a side position of the feed path 19 that does not overlap with the feed path 19 for the medium P in the width direction X, a sufficient space for positioning the rear tray 3, which serves as the medium placing unit, can be ensured on the back side of the feed path 19. In this case, since the feed path 19 does not need to be displaced forward (+Y), it is possible to omit modification of the shape of the lower housing 55 of the image reading apparatus 15 and modification of the routing of the drive belt 49.

Further, in the above embodiment, since the hinge 18 of the openable cover 17 is located on the back side (−Y) of the apparatus, the openable cover 17 comes to the back side (−Y) of the position of the feed path 19 in the printer main body 2 when the openable cover 17 is opened. Accordingly, the back surface of the openable cover 17 cannot be used as the medium placing unit 3. In this case, the hinge 18 of the openable cover 17 is disposed at a position closer to the front side (+Y) of the apparatus, and the openable cover 17 is configured to open forward. Alternatively, the openable cover 17 can be of a two-stage type in which the openable cover 17 opens backward (−Y) in a first stage, and then slides forward (+Y) in a second stage, so that the openable cover 17 serves as the medium placing unit 3.

What is claimed is:

1. A recording apparatus comprising:
   a feeding unit that feeds a medium placed on a medium placing unit located on a back side of the apparatus;
   a transport unit that transports a medium fed from the feeding unit;
   a recording unit that performs recording on a medium transported from the transport unit;
   a reverse path which includes a reverse section that transports a medium in a reverse direction after recording is performed by the recording unit to turn over the medium; and
   a feed driving motor that drives the feeding unit, wherein the feed driving motor is disposed above the reverse path.

2. The recording apparatus according to claim 1, wherein the feed driving motor is disposed above the reverse section.

3. The recording apparatus according to claim 1, wherein the feed driving motor is disposed on a back side of a feed path between the feeding unit in which a medium is fed by the feeding unit and the transport unit.

4. The recording apparatus according to claim 1, wherein the feed driving motor is disposed at a position that overlaps with the reverse path in a width direction and a depth direction of the recording apparatus in top view.

5. The recording apparatus according to claim 1, further comprising
   an image reading apparatus having a reading unit that reads an image and disposed above the recording apparatus, the image reading apparatus including a read driving motor that drives the reading unit, wherein
   the feed driving motor is disposed at a position that overlaps with the read driving motor in at least one of a depth direction and a height direction of the recording apparatus in side view.

6. The recording apparatus according to claim 1, further comprising
   an openable cover disposed at an opening of the medium placing unit, the openable cover being configured to open for placing a medium, wherein
   the feed driving motor is disposed at a position that overlaps with the openable cover in a closed state in a depth direction of the recording apparatus in top view.

7. The recording apparatus according to claim 1, further comprising
   an openable cover disposed at an opening of the medium placing unit, the openable cover being configured to open for placing a medium, wherein
   the feed driving motor is disposed at a position that overlaps with the openable cover in a width direction of the recording apparatus in top view.

* * * * *